United States Patent [19]

Oprea

[11] Patent Number: 5,007,671
[45] Date of Patent: Apr. 16, 1991

[54] UNDER THE RAIL LINER WITH TABS

[75] Inventor: John C. Oprea, Caro, Mich.

[73] Assignee: Durakon Industries, Inc., Lapeer, Mich.

[21] Appl. No.: 455,681

[22] Filed: Dec. 22, 1989

[51] Int. Cl.[5] .......................................... B60R 13/01
[52] U.S. Cl. ................................................. 296/39.2
[58] Field of Search ........................... 296/39.1, 39.2; 105/423

[56] References Cited

U.S. PATENT DOCUMENTS

| | | | |
|---|---|---|---|
| 4,047,749 | 9/1977 | Lambitz et al. | 296/39.2 |
| 4,659,133 | 4/1987 | Gower | 296/39.2 |
| 4,752,097 | 6/1988 | Van Kirk et al. | 296/39.2 |
| 4,872,720 | 10/1989 | Nagy | 296/39.1 |

Primary Examiner—Margaret A. Focarino
Assistant Examiner—Gary C. Hoge
Attorney, Agent, or Firm—Dykema Gossett

[57] ABSTRACT

A truck bed liner which protects the bed of a pick-up truck is fastened to the pick-up truck bed without needing to drill into or puncture the bed of the pick-up truck. The liner is comprised of a resilient portion which is adapted to be deformed and retained in its deformed position within the lipped end of the truck bed side wall rail. The force brought about by deforming the resilient portion acts on the liner in a way which prevents it from dislodging from the truck bed.

4 Claims, 3 Drawing Sheets

UNDER THE RAIL LINER WITH TABS

BACKGROUND OF THE INVENTION

The present invention relates generally to improvements in truck bed liners, and more specifically relates to truck bed liners which fasten to a truck bed without drilling into or penetrating the truck bed.

One of the most common devices used for general purpose cargo transporting is a pick-up truck. In order to prevent the bed portion of the pick-up truck from being marred and otherwise damaged by cargo, bed liners have been devised which protect the bed's walls and floor portions from damage. Although truck bed liners prevent damage to the truck bed, mounting techniques which have been used to mount the truck bed liner to the truck bed have introduced problems of their own.

A common technique employed in mounting truck bed liners to truck beds has been to simply drill holes through the liner and through the bed. General purpose utility fasteners such as screws, plastic retaining pins, etc. are inserted in through the existing hole, and the fastener pins the bed to the liner at that particular location. Several of these fasteners would be employed, and ultimately the liner would be safely affixed to the bed. However, there are many drawbacks that accompany this type of fastening technique.

One such drawback is the aesthetically displeasing appearance of the pick-up bed should the pick-up liner ever be removed from the pick-up. Moreover, when such holes are placed in the pick-up bed, paint and other protective coatings are removed, thus introducing the possibility that water, salt and other elements can attack and corrode the bed metal. This destructive corrosion not only shortens the life of the pick-up truck bed, it also diminishes the overall vehicle value and may void certain aspects of the vehicle's warranty.

Accordingly, even with present truck bed liner constructions, there is a need for a liner that affixes to the truck bed without introducing any holes or other modifications which affect the truck bed integrity.

It is therefore a principal object of this invention to provide a truck bed liner which can protect the truck bed without introducing any holes into the truck bed.

Another object of the present invention is to provide a truck bed fastening means which can be used multiple times without affecting its ability to retain and hold the truck bed liner within the truck bed.

Still another object of this invention is to provide a fastening means which is strong, durable, corrosion-resistant and inexpensive to manufacture.

SUMMARY OF THE INVENTION

In light of the foregoing objects, the present invention provides a protective liner for a truck bed, the bed having a floor, a front wall and two opposing side walls, each side wall having a lipped end portion, the liner comprising a liner member adapted to be received into the truck bed, the liner member having a bottom, a front wall and two opposing side walls, the liner side walls respectively associated with the truck bed side walls, the liner side walls each having a first and second end, the first end of each liner side wall connected to the liner bottom and the second end of each liner side wall having a resilient portion wherein the resilient portion is adapted to be deformed and retained in its deformed position within the lipped end of the truck bed side walls, the resilient portion of each liner side wall urging its associated liner side wall against its respectively associated truck bed side wall and against the truck bed floor, wherein the urging acts to retain the liner member within the truck bed.

In a preferred embodiment of the present invention, the resilient portion of each liner side wall is comprised of at least one element which depends from the second end of each liner side wall.

In another embodiment of the present invention, the resilient portion of each liner side wall comprises the second end of the first and second liner side walls wherein the vertical height of each liner side wall is greater than the vertical height of the truck bed side wall, the second end of the first and second liner side walls is adapted to be deformed and retained in its deformed position within the lift end of their respectively associated truck bed side wall.

Still, in another embodiment of the present invention, the dependent element includes a plurality of tabs depending from the second end of each of liner side wall.

These, together with other objects and advantages which will become subsequently apparent, reside in the details of construction and operation as more fully hereinafter are described and claimed.

DETAILED DESCRIPTION OF THE PREFERRED EMBODIMENTS

Figure 1:
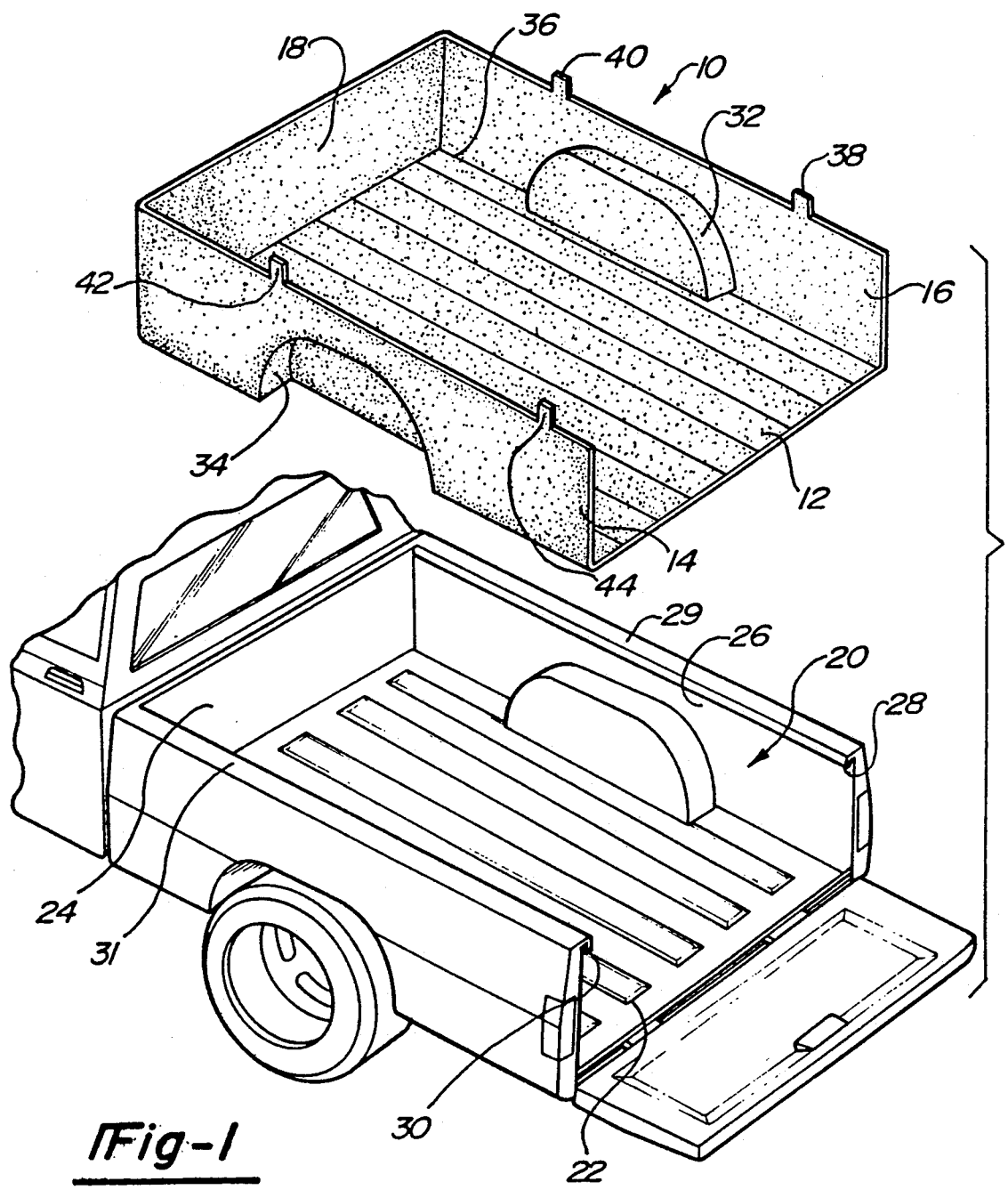
FIG. 1 is an isometric view of a pick-up truck bed and one embodiment of the pick-up bed liner of the present invention positioned over the pick-up truck bed.

Referring now to the drawings, FIG. 1 depicts a conventional pick-up truck bed 20 which is comprised of a floor portion 22, a front wall 24, and two opposing side walls 26, 27 (27 not visible from this view). Each side wall 26, 27 has a respectively associated upper rail 29, 31. This upper rail is characterized by a lipped end portion 28, 30. As will be seen shortly, it is this lipped end portion of each side wall that will be used to retain the truck bed liner 10 within the truck bed without having to resort to the use of metal or plastic fasteners which penetrate the truck bed.

The protective liner 10 is comprised of a bottom portion 12, a liner front wall 18, and opposing liner side walls 14, 16. The truck bed liner 10 is also constructed so that it snugly conforms to the irregularities of the particular pick-up model it is designed to fit, such as rear wheel wells which protrude into the truck bed 32, 34. The truck bed liner shown in FIG. 1 uses depending resilient portions 38, 40, 42 and 44 as the means for retaining the truck bed liner within the truck bed. These resilient portions 38–44, as shown in FIG. 1, are depicted as they would be viewed in their undeformed position. Resilient portions 38–44 extend above liner side walls 14, 16 such that the vertical height of the upper edges of the resilient portions is greater than the vertical height of the truck bed side walls 26 and 27. Once the truck bed liner 10 is placed into the truck bed 20, these resilient portions 38-44 can be pushed under their associated lipped end portion 28, 30 and will be retained in their deformed position by their associated lipped end portion. Because of the resilience of these resilient portions 38-44, they exert a resultant force and thereby urge their respective liner side wall against the associated truck bed side wall and also urge their respective liner side wall against the truck bed floor 22. This urging force is of sufficient strength to keep the truck bed liner firmly intact and eliminates any possibility of the liner 10 separating from the bed 20.

Figure 2:
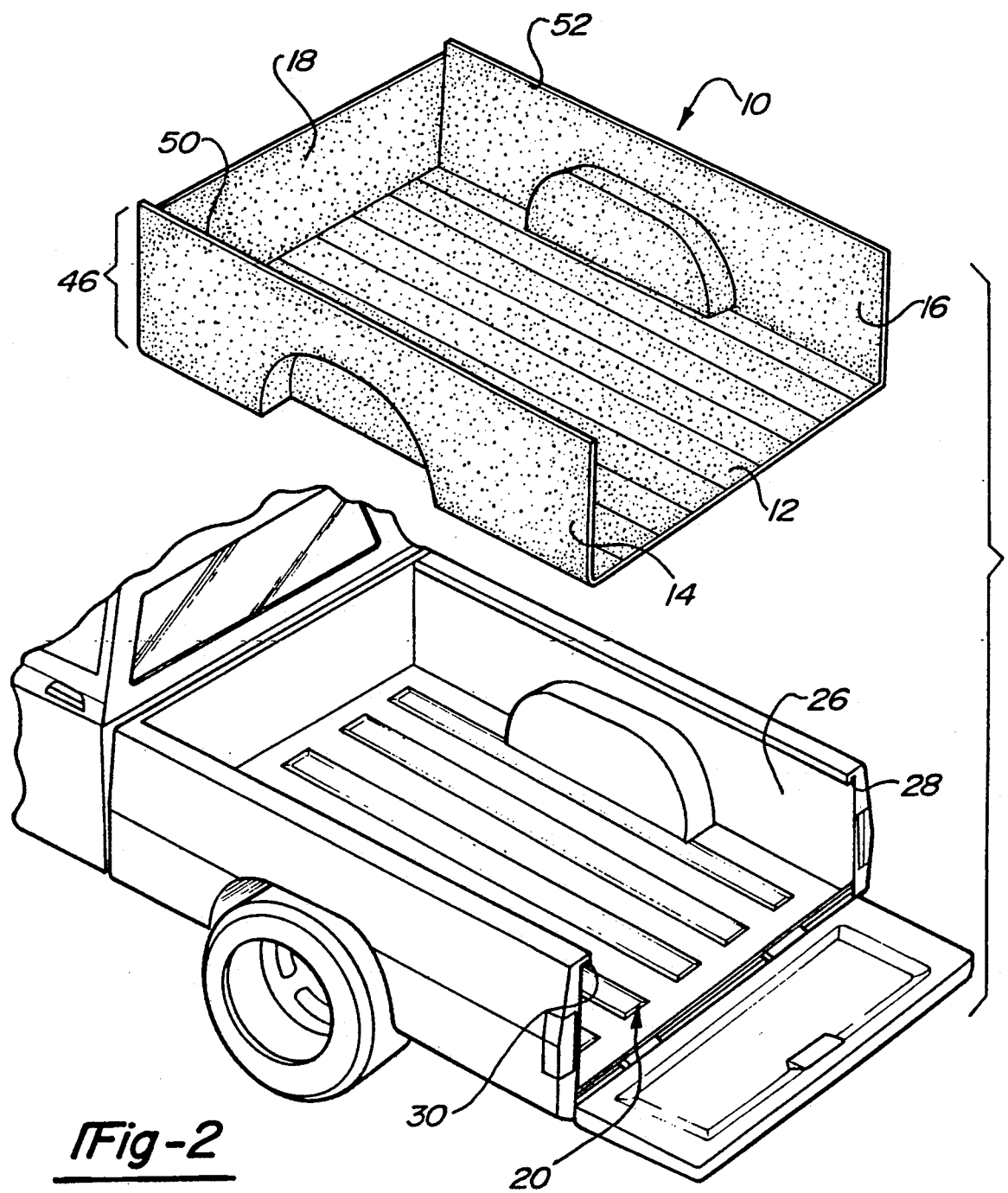
FIG. 2 is an isometric view of a pick-up truck bed and a second embodiment of the bed liner of the present invention positioned over the pick-up truck bed.

Referring now to FIG. 2 of the drawings, a second embodiment of truck bed liner 10 is shown positioned above a truck bed 20. This embodiment of the truck bed liner 10 is in many ways identical to that of FIG. 1, inasmuch as it is comprised of a bottom 12, two opposing side walls 14, 16 and a front wall 18. However, the subtle distinction between the two embodiments is evidenced by the vertical height 46 of the side walls 14, 16. As can be seen in FIG. 2, the vertical height of the side walls 14, 16 exceeds the vertical height of the front wall 18. When the liner of FIG. 2 is placed into the truck bed 20, side walls 14, 16 will be prevented from directly contacting truck bed side walls 26, 27 (side wall 27 not visible from this view) because the vertical height 46 of the liner side walls 14, 16 exceeds the vertical height of the bed side walls 26, 27. Instead of using a depending resilient portion 38-44, as shown in the embodiment of FIG. 1, the embodiment of FIG. 2 uses the entire upper horizontal edge 50, 52 of each liner side wall 14, 16 to retain the liner 10 within the truck bed 20. This is accomplished by placing the liner 10 inside the truck bed 20 and forcing the upper horizontal edge 50, 52 of each liner side wall 14, 16 underneath its respective bed side wall lift end portion 28, 30.

Figure 3:
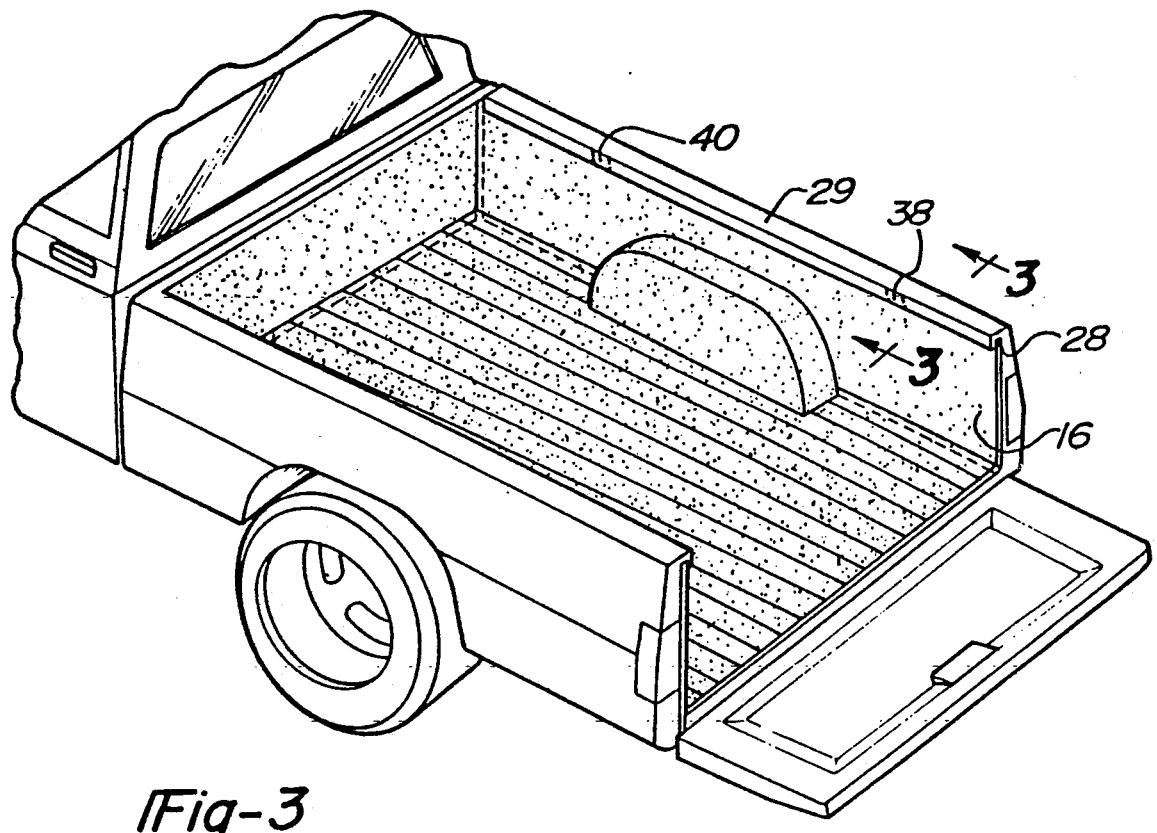
FIG. 3 is an isometric view of a pick-up truck bed with the bed liner of the present invention inserted in place into the pick-up truck bed.

Now referring to FIG. 3, a pick-up truck is shown having the bed liner of FIG. 1 placed within its bed. Resilient depending portions 38, 40 are shown hidden beneath the lipped end 28 of upper side wall rail 29. These resilient portions have been deformed and pushed under lipped end portion 28, thereby forcing liner wall 16 against truck side wall 26 (not shown) and also causing liner side wall 16 to exert a downward force upon bed floor 22 (not shown).

Figure 4:
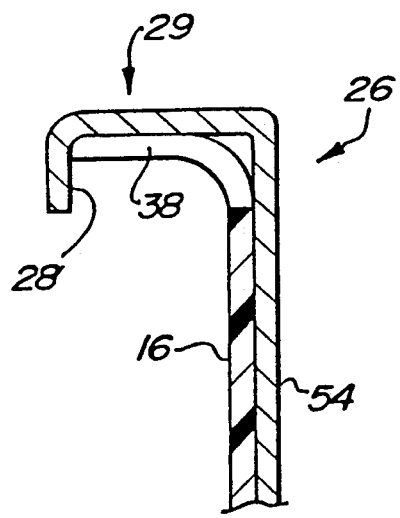
FIG. 4 is a partial cross-sectional view of a pick-up truck bed side wall taken substantially along line 3—3 in FIG. 3.

Now referring to FIG. 4, bed side wall 26 is comprised of a vertical panel 54 and an upper rail 29. Upper rail 29 is terminated in a lipped end portion 28. Depending resilient portion 38 is shown in its deformed position. Note that unlike its orientation depicted in FIG. 1 wherein depending resilient portion 38 is coplanar with liner side wall 16, in FIG. 4 resilient depending portion 38 is deformed and retained in a position which causes it to be substantially perpendicular to the plane of liner side wall 16. Because of the resilience of depending portion 38, it urges liner side wall 16 against vertical panel 54 and against truck bed floor 22 (not shown). It is the resiliency feature of depending portions 38-44 that causes bed liner 10 to maintain its position within the truck bed 20.

The liner embodiment depicted in FIG. 2 is retained in the same way as the liner embodiment depicted in FIG. 1, the only difference being that the entire upper horizontal edge 50, 52 of liner side wall 14, 16 is forced under and retained by its respective upper rail 29, 30 and respective lipped end portion 30, 32.

The foregoing detailed description shows that the preferred embodiments of the present invention are well-suited to fulfill the objects stated. It is recognized that those skilled in the art may make various modifications or additions to the preferred embodiments chosen here to illustrate the present invention, without departing from the spirit of the present invention. For example, the depending resilient portions 38-44 are shown to be extensions of the same material which makes up the liner bottom, front wall, and opposing side walls. It is contemplated that these depending portions could be made from any number of substances different from the substance used to make the liner. From a cost and manufacturing standpoint, there is an advantage in making the depending portions from the same material that the rest of the liner is made from in that there are not any assembly steps associated with affixing the depending portion to the remainder of the liner body. It is contemplated that springs, clips or the like may be used in place of resilient portions 38-44 or upper horizontal edge 50, 52 to accomplish the same retaining function. Accordingly, it is to be understood that the protection sought to be afforded hereby should be deemed to extend to the subject matter defined in the appended claims, including all fair equivalents thereof.

I claim:

1. A protective liner for a truck bed, said bed having a floor, a front wall and two opposing side walls, each side wall having a lipped end portion, comprising:
   a liner member adapted to be received into said truck bed, said liner member having a bottom, a front wall and two opposing side walls, said opposing liner side walls respectively associated with said truck bed side walls, said liner side walls each having a first and second end, said first end of each liner side wall connected to said liner bottom and said second end of each liner side wall having a resilient portion, wherein the vertical height of said resilient portion and liner side wall is greater than the vertical height of said truck bed side wall and wherein said resilient portion is deformed and retained in its deformed position within said lipped end of said truck bed side walls, said resilient portion of each said liner side wall urging its associated liner side wall against its respectively associated truck bed side wall and against said truck bed floor wherein said urging acts to retain said liner member within said truck bed.

2. The liner of claim 1, wherein said resilient portion comprises at least one element depending from said second end of each of said liner side walls.

3. The liner of claim 1, wherein said resilient portion comprises said second end of said first and second liner side walls and wherein said vertical height of each liner side wall is greater than the vertical height of said truck bed side wall, said second end of said first and second liner side walls is adapted to be deformed and retained in its deformed position within said lipped end of their respectively associated said truck bed side wall.

4. The liner of claim 2, wherein said depending element includes a plurality of tabs depending from said second end of each liner side wall.

* * * * *